United States Patent
Jacobs

[11] 3,800,675
[45] Apr. 2, 1974

[54] UNITARY PISTON-SUCTION VALVE ASSEMBLY

[75] Inventor: James W. Jacobs, Dayton, Ohio

[73] Assignee: General Motors Corporation, Detroit, Mich.

[22] Filed: Apr. 17, 1972

[21] Appl. No.: 244,379

[52] U.S. Cl............... 92/74, 417/273, 417/525, 417/550, 417/551
[51] Int. Cl.................. F01b 7/02, F04b 21/04
[58] Field of Search ........... 91/222, 442; 92/74; 137/516.11, 516.13, 516.15, 525; 417/525, 550, 551, 262, 273, 523

[56] References Cited
UNITED STATES PATENTS

| | | | |
|---|---|---|---|
| 1,568,147 | 1/1926 | Fischbacher | 417/525 |
| 2,963,217 | 12/1960 | Wysong | 417/550 X |
| 1,279,920 | 9/1918 | Sebald | 137/516.15 |
| 2,613,651 | 10/1952 | Herreshoff | 92/74 X |
| 1,955,992 | 4/1934 | West | 417/550 X |
| 2,069,035 | 1/1937 | Hollmann | 417/525 X |
| 3,200,797 | 8/1965 | Dillenberg | 92/140 X |

FOREIGN PATENTS OR APPLICATIONS

| 321,510 | 11/1929 | Great Britain | 417/550 |
|---|---|---|---|

Primary Examiner—C. J. Husar
Assistant Examiner—Leonard Smith
Attorney, Agent, or Firm—K. H. MacLean, Jr.

[57] ABSTRACT

A refrigerant compressor including a housing having a compact piston-intake valve assembly mounted for reciprocation within a cylinder bore. The piston-valve assembly is formed from tubular material with its ends covered by a flexible metal inlet valve whose peripheral edge engages the end of the piston. The circular intake valve is spot welded at two diametrically opposite locations to secure the valve to the end of the tubular piston.

1 Claim, 4 Drawing Figures

PATENTED APR 2 1974 3,800,675

UNITARY PISTON-SUCTION VALVE ASSEMBLY

This invention relates to refrigerant compressors and more particularly to a compact and economical piston-intake valve assembly of tubular material with circular inlet valves covering its open ends.

The subject refrigerant compressor includes a piston which is reciprocal within a cylinder bore in the compressor housing. The piston itself is economically formed from readily available tubular material having an outer diameter equal to the diameter of the compressor's cylinder. Annular grooves are formed in the tube's outer surface near either end for receiving O-ring seals to prevent refrigerant leakage between the piston and the cylinder housing. The open ends of the piston are covered by circular metal inlet valves whose peripheral edges engage the ends of the tubular piston. The metal inlet valves are secured to the tubular piston at two diametrically opposite locations by spot welding.

The piston is reciprocated within a cylinder by an eccentric crank of a drive shaft which projects through a mid-portion of the piston. A drive shaft bearing is formed through the piston by welding a tubular crank bearing in the mid-portion of the tubular piston.

An advantage of the aforedescribed tubular piston-inlet valve assembly is its compactness and economy since it is manufactured from readily available tubular material. The tubular material is first cut into predetermined length, then a bore is formed normal to the axis for insertion of a drive shaft bearing. Annular channels are cut at both ends of the tubular piston for receiving O-ring seals. Circular shaped thin metal valves are laid over the ends of the tubular piston and secured by spot welding at two diametrically opposite locations. As the piston moves downward in the cylinder, the peripheral edge of the inlet valve is lifted away from the end of the piston to admit refrigerant into the compression chamber formed between the piston and the cylinder head. When the piston moves upward in the cylinder, the peripheral edge of the inlet valve is seated against the end of the tubular piston to prevent back flow of refrigerant through the tubular piston.

Therefore, an object of the present invention is to provide a compact dual-ended piston-inlet valve assembly for piston type compressors with thin metal inlet valve covering the end of a tubular piston for supplying refrigerant to the compression chamber through the piston.

A further object of the present invention is to provide a simple and economically formed piston-inlet valve assembly for piston type compressors which use readily available tubular material which is cut into prescribed length and whose ends are covered by thin metal inlet valves.

Further objects and advantages of the present invention will be readily apparent from the following detailed description, reference being had to the following drawings.

Figure 1:
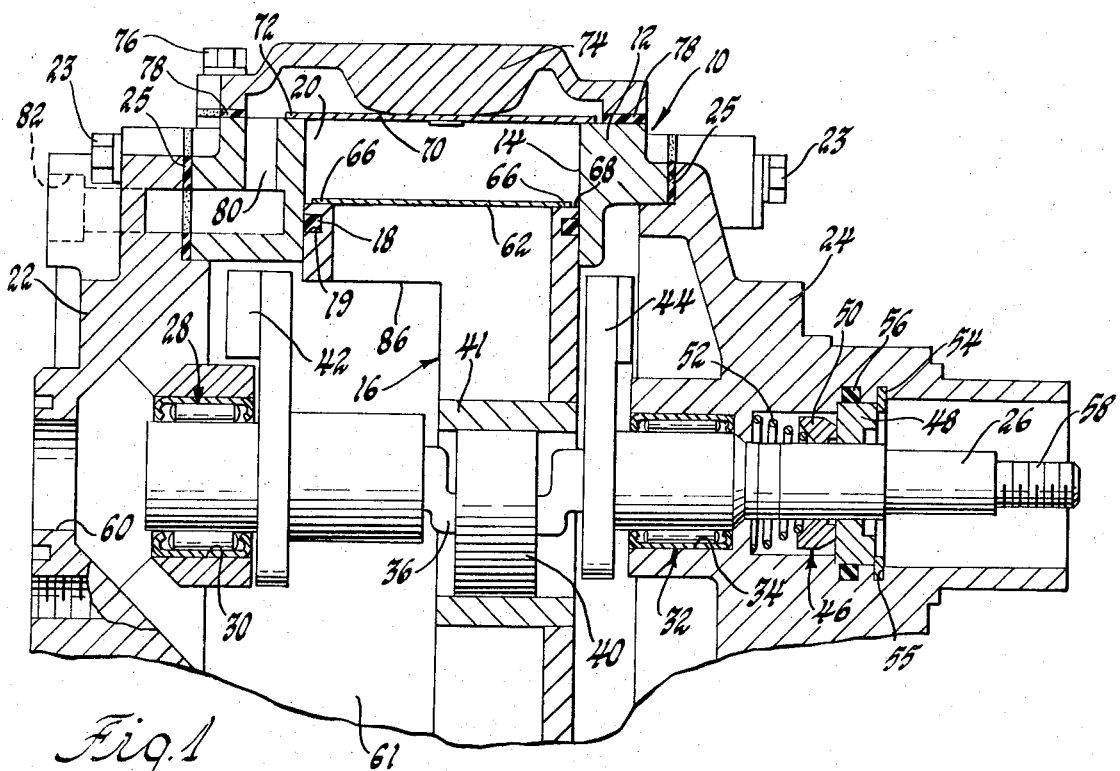
FIG. 1 is a vertical section view of a piston type compressor with the present tubular piston and inlet valve assembly.

In FIG. 1, a compressor 10 is illustrated including a housing 12 with a cylinder bore 14 formed therein. A dual-ended piston 16 is reciprocally supported within the cylinder bore 14. Annular O-ring seals 18 in grooves or channels 19 prevent leakage of refrigerant from compression chambers 20 formed at either end of the piston 16. Housing 12 has a rear end cover 22 and a front end cover 24 which are attached to the housing by fasteners 23 and sealed by gaskets 25. The cover members 22 and 24 support a drive shaft 26 for rotation within the compressor housing.

More specifically, a needle bearing assembly 28 within a bore 30 in the rear cover 22 supports one end of shaft 26 and a needle bearing assembly 32 in bore 34 of the front end cover 24 supports the other end of the shaft 26. An eccentric crank portion 36 on the shaft 26 extends through a sleeve assembly 40 which is secured in a cylindrical bearing 41 of piston 16. The eccentric crank portion 36 of the shaft extends through an elongated bore 43 in sleeve 40 causing reciprocation of the piston within the cylinder bore 14. Sleeve 40 is secured to piston bearing 41 to prevent relative rotation. Two counterweights 42 and 44 are attached to the shaft 26 to counterbalance forces caused by the compression strokes.

A seal assembly 46 encircles the forward end of shaft 26 to prevent leakage of refrigerant from the housing between the shaft 26 and the cover 24. Seal assembly 46 includes a stationary member 48 and a rotatable member 50 which are pressed together by a spring 52. The member 48 is retained to cover 24 by an expansion ring 54 which engages a groove 55. An O-ring seal 56 surrounds member 48 to prevent refrigerant leakage therebetween. A pulley assembly (not shown) is adapted to be fastened to the threaded end 58 of the shaft 26 for rotating the shaft 26 to cause the piston 16 to reciprocate within the housing 12.

Figure 2:
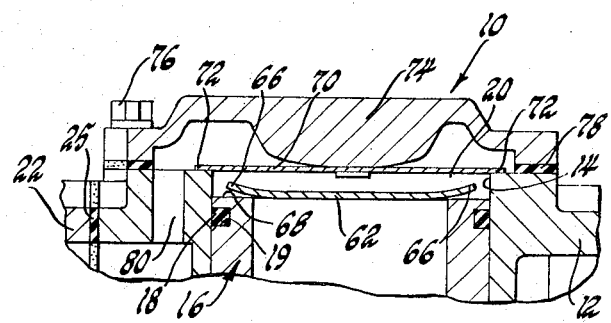
FIG. 2 is a fragmentary sectioned view of the compressor and one end of the tubular piston with the inlet valve in an open position.
Figure 4:
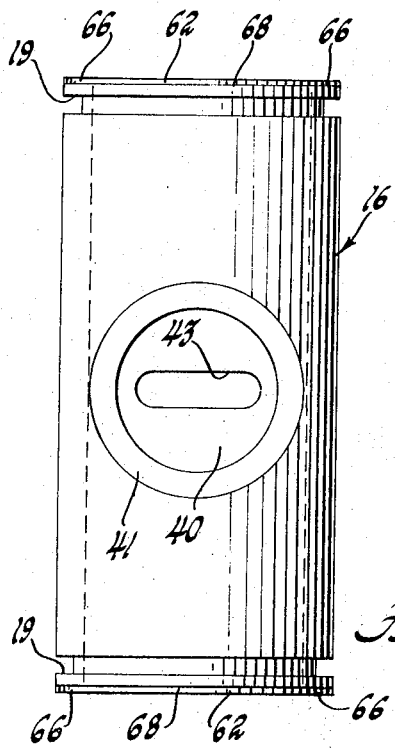
FIG. 4 is an elevational view of the tubular piston showing the drive shaft bearing.

Refrigerant enters the compressor 10 through an inlet 60 in the end cover 22. It then flows into the interior 61 of housing 12 to the center of the tubular piston 16. Both ends of the tubular piston are covered by thin metal valve members 62 of generally circular shape. The inlet valves 62 are secured to the ends of the tubular piston at two diametrically opposite locations by spot welds 64. The peripheral edges 66 of the valve members 62 seat against the ends 68 of the tubular piston. When the piston moves downward in the cylindrical bore 14 as shown in FIG. 2, the pressure differential between the compression chamber 20 and the interior 61 causes the valve's peripheral edge 66 to lift off the end 68 of the piston 16. Refrigerant then flows into the compression chamber 20. When the piston moves upward in the cylindrical bore 14, the edge 66 of valve 62 seats against the end 68 of piston 16 to prevent the flow of refrigerant from compression chamber 20 to the interior 61.

The cylindrical bore 14 in housing 12 is covered by a discharge valve member 70 whose peripheral edge 72 seats against the end of the housing 12 surrounding the cylinder 14. The mid-portion of discharge valve 70 is pressed downward against the housing 12 by a cylinder head member 74 attached to housing 12 by bolt fasteners 76. A gasket 78 prevents refrigerant leakage between head 70 and housing 12. A discharge passage 80 formed in the cylinder head 74 and housing 12 directs refrigerant from the compressor. When the piston 16 moves upward in the cylinder bore 14, the refrigerant is pressurized in chamber 20 until a predetermined pressure lifts the peripheral edge 72 of valve 70 from housing 12. Refrigerant then flows into the passage 80 and out of the compressor.

Figure 3:
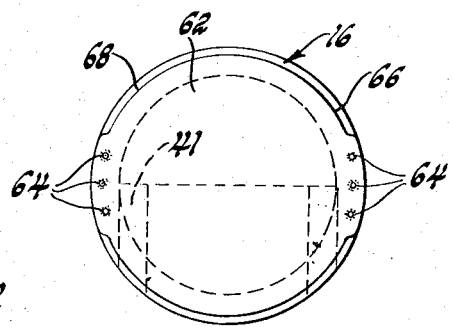
FIG. 3 is a view of one end of the tubular piston-inlet valve assembly.

As previously stated, the piston 16 is economically formed from readily available tubular stock. The tubular material is first cut into preselected lengths and then grooves 19 are formed adjacent the ends of the piston. Next, a bore is formed at the piston's mid-portion to receive the cylindrical bearing member 41. The bearing member 41 may be press fit within the bore or welded in place. Next, thin metal outlet valves 62 are laid over the ends of the tubular piston 16 and spot welded at 64 as shown in FIG. 3. A cut out portion 86 of the tubular piston interconnects the interior of the tubular piston 16 with the interior 61 of the compressor.

While the embodiments of the tubular piston-inlet valve assembly shown is a preferred embodiment, other embodiments may be adapted.

What is claimed is as follows:

1. A simple combination piston and intake valve assembly for a reciprocating piston-type compressor having a housing with a cylinder bore therein and a drive shaft supported in the housing normal to the axis of said bore with a crank portion in said bore comprising: a tubular piston adapted to be supported in said bore and characterized by a uniform thickness cylindrical wall which surrounds a hollow interior and open ends which is economically made from commercially available tubular material cut into predetermined lengths; a cylindrical bearing insert also of commercially available tubular material fixed within an opening in the mid portion of said tubular piston and extending normal to its axis; a sleeve member within said tubular bearing insert and attached thereto having an elongated hole therein extending laterally with respect to the axis of said piston and adapted to engage said crank portion of said drive shaft to permit lateral movement of said crank portion within said elongated hole and to cause reciprocal movement of said piston in the cylinder bore when the crank portion is rotated with the drive shaft; flexible inlet valve of thin sheet metal material and having a generally circular configuration covering the open ends of the tubular piston to form walls of compression chambers formed between said piston and the cylinder bore of the compressor; the peripheral edge of the generally circular inlet valves normally engaging and seating against the end of said tubular piston during compression strokes of said piston; said circular inlet valves being attached to the ends of said tubular piston by spot welds formed at diametrically opposite locations to retain said inlet valves on the ends of said tubular piston whereby during an intake stroke of said piston the peripheral edges of said flexible inlet valves are lifted from the end of said tubular piston to permit a flow of fluid from the interior of said piston into compression chambers formed at either end of the piston.

* * * * *